United States Patent
Karem et al.

(10) Patent No.: US 10,005,541 B2
(45) Date of Patent: Jun. 26, 2018

(54) METHODS FOR PROVIDING A DURABLE SOLAR POWERED AIRCRAFT WITH A VARIABLE GEOMETRY WING

(71) Applicant: Karem Aircraft, Inc., Lake Forest, CA (US)

(72) Inventors: Abe Karem, North Tustin, CA (US); Benjamin Tigner, Laguna Beach, CA (US)

(73) Assignee: KAREM AIRCRAFT, INC., Lake Forest, CA (US)

( * ) Notice: Subject to any disclaimer, the term of this patent is extended or adjusted under 35 U.S.C. 154(b) by 0 days. days.

(21) Appl. No.: 15/052,699

(22) Filed: Feb. 24, 2016

(65) Prior Publication Data

US 2016/0368590 A1 Dec. 22, 2016

Related U.S. Application Data

(60) Provisional application No. 62/152,747, filed on Apr. 24, 2015, provisional application No. 61/120,369, (Continued)

(51) Int. Cl.
| | |
|---|---|
| G05D 1/00 | (2006.01) |
| B64C 39/02 | (2006.01) |
| B64F 5/00 | (2017.01) |
| B64C 3/42 | (2006.01) |
| B64D 27/24 | (2006.01) |
| B64C 3/16 | (2006.01) |
| B64C 11/28 | (2006.01) |

(Continued)

(52) U.S. Cl.
CPC ............. *B64C 3/42* (2013.01); *B64C 3/16* (2013.01); *B64C 11/28* (2013.01); *B64C 39/024* (2013.01); *B64D 27/24* (2013.01); *B64F 5/10* (2017.01); *G05D 1/0011* (2013.01); *G05D 1/0088* (2013.01); *H02S 10/40* (2014.12); *H02S 40/38* (2014.12); *B64C 2201/021* (2013.01); *B64C 2201/042* (2013.01); *B64C 2201/06* (2013.01); *B64C 2201/104* (2013.01); *B64C 2201/122* (2013.01); *B64C 2201/165* (2013.01); *B64D 2211/00* (2013.01); *Y02T 50/12* (2013.01); *Y02T 50/44* (2013.01); *Y02T 50/62* (2013.01)

(58) Field of Classification Search
None
See application file for complete search history.

(56) References Cited

U.S. PATENT DOCUMENTS

| | | |
|---|---|---|
| 3,089,670 A | 5/1963 | Johnson |
| 5,019,007 A | 5/1991 | Miller |

(Continued)

FOREIGN PATENT DOCUMENTS

WO 01/58756 A2 8/2001

*Primary Examiner* — Thomas G Black
*Assistant Examiner* — Demetra R Smith-Stewart
(74) *Attorney, Agent, or Firm* — Fish IP Law, LLP

(57) ABSTRACT

Methods of manufacturing and operating a solar powered aircraft having segmented wings that can be reconfigured during flight to optimize collection of solar energy are described. The aircraft have rigid construction that is resistant to inclement weather and is configured to rely on free flight control at high altitude and under conventional conditions, thereby providing flight duration in excess of 2 months. The aircraft is particularly suitable for use as part of a telecommunications network.

22 Claims, 17 Drawing Sheets

Related U.S. Application Data filed on Feb. 24, 2015, provisional application No. 62/120,369, filed on Feb. 24, 2015.

(51) Int. Cl.
*H02S 10/40* (2014.01)
*H02S 40/38* (2014.01)
*B64F 5/10* (2017.01)

(56) References Cited

U.S. PATENT DOCUMENTS

| | | |
|---|---|---|
| 5,214,586 A | 5/1993 | Nance |
| 5,810,284 A | 9/1998 | Hibbs et al. |
| 6,505,795 B1 | 1/2003 | Thompson et al. |
| 6,550,717 B1 | 4/2003 | MacCready et al. |
| 6,913,247 B2 | 8/2005 | Cox et al. |
| 7,281,681 B2 | 10/2007 | MacCready et al. |
| 7,530,527 B2 | 5/2009 | Kelleher |
| 7,555,297 B2 | 6/2009 | Hibbs et al. |
| 7,762,495 B2 | 7/2010 | Miller |
| 8,448,898 B1 * | 5/2013 | Frolov .................. B64C 39/024 244/59 |
| 9,604,715 B2 * | 3/2017 | Karem ..................... B64C 3/52 |
| 2003/0141409 A1 * | 7/2003 | Lisoski .................... B64C 3/42 244/13 |
| 2005/0118952 A1 | 6/2005 | Cox et al. |
| 2008/0001028 A1 | 1/2008 | Kendall et al. |
| 2009/0114773 A1 | 5/2009 | Helou, Jr. |
| 2010/0213309 A1 | 8/2010 | Parks |
| 2011/0004361 A1 | 1/2011 | Goupil et al. |
| 2011/0144834 A1 | 6/2011 | Sommer |
| 2011/0147517 A1 | 6/2011 | Llamas Sandin |
| 2012/0018571 A1 | 1/2012 | Goelet |
| 2012/0091262 A1 | 4/2012 | Rawdon et al. |
| 2012/0091263 A1 * | 4/2012 | Parks ....................... B64C 3/16 244/46 |
| 2012/0248241 A1 | 10/2012 | Goelet |
| 2013/0078096 A1 | 3/2013 | Couderc et al. |
| 2013/0099063 A1 * | 4/2013 | Grip ....................... B64D 27/24 244/219 |
| 2013/0105637 A1 | 5/2013 | Stamps et al. |
| 2014/0203139 A1 | 7/2014 | Moussouris et al. |
| 2014/0319267 A1 | 10/2014 | Paranjape et al. |
| 2016/0167764 A1 * | 6/2016 | Grip ....................... B64D 27/24 244/123.4 |

* cited by examiner

METHODS FOR PROVIDING A DURABLE SOLAR POWERED AIRCRAFT WITH A VARIABLE GEOMETRY WING

This application claims the benefit of U.S. Provisional Application No. 62/152,747, filed Apr. 24, 2015, U.S. Provisional Patent Application No. 62/120,369, filed Feb. 24, 2015, and U.S. Provisional Patent Application No. 62/120,361, filed Feb. 24, 2015. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is aircraft, particularly solar powered aircraft.

BACKGROUND

Orbiting and geosynchronous satellites are in wide use for communication between ground communications hubs and directly between communication users. The revenue of the satellite industry exceeded $200 B in 2014, and over 400 satellites are currently in geosynchronous orbits.

The preparation and delivery costs of such satellites represents a considerable expense, however, and rocket launches themselves represent a non-negligible risk. While satellites have the advantage of requiring no significant energy in order to remain in orbit for years, they lack the ability to recover and to change orbits as may be required to modify the communication equipment or the serviced area. Additionally, while the satellites offer wide area coverage their great communications distance results in the need to use high transmission power and relatively narrow antenna apertures, which in turn results in communications time delays.

The idea of sub-orbital vehicles as airborne communications nodes utilizing both lighter than air and heavier than air vehicles is well known. For example, the military use communication relay aircraft in specific applications where they offer a versatility advantage compared to satellites.

Because of their required high launch energy and extreme system reliability, satellites present substantially higher initial costs than aircraft. However, by maintaining orbit for extended periods of time they can offer lower cost per hour. In order to compete effectively with satellites, an aircraft needs to provide large communications area coverage, dependable service, and many hours of operations per launch and recovery cycle. To provide large area coverage for high frequency band line-of-sight communications and for dependable service, such an aircraft must fly at high altitudes and above weather. For very long endurance the aircraft will preferably be unmanned and use a renewable energy source. When flying above the weather, solar energy is a readily available energy source for aircraft with endurance greater than a few days. Solar powered unmanned aircraft first flew in 1974, and manned aircraft first flew in 1979. Solar energy, however, is a relatively diffuse source that can limit the power available to propel the aircraft. In addition, reliance on solar power can restrict the latitude and/or time of year that such aircraft can operate effectively.

Flying at high altitude at low power levels requires a very light aircraft with a large lifting surface area (i.e. low wing loading). Unmanned solar powered aircraft developed between 1983 and 2003 by AeroVironment, Inc. under NASA's Environmental Research Aircraft and Sensor Technology (ERAST) program aimed at ever increasing aircraft cruise altitude. On Aug. 14, 2001 their Helios unmanned aircraft set an altitude record of 96,863 feet (29,524 m). To achieve such a high altitude the highly innovative Helios design included a wing span of 247 feet, a wing area of 1,976 square feet, and a normal weight of only 1,600 lb (0.81 lb/ft$^2$ wing loading). In order to achieve such a low weight, Helios used an all-wing design, a very light flexible structure, a high level of weight distribution along the span (span-loading), and a distributed powerplant configuration. Unfortunately, such extremely flexible structures are relatively fragile. The Helios was lost in an inflight failure, with aircraft loss due to wind gusts on Jun. 26, 2003.

Flying in clear weather or at low altitude is less challenging, while less useful for communications purposes, has provided progress in developing the system reliability required for long endurance flight. For example, QinetiQ's 74 ft span Zephyr unmanned solar powered aircraft set, on July 2010, a 336 hour, 22 minute endurance record for unmanned aircraft. While the Zephyr endurance record was set during summer months (from July 9 to July 23 in Yuma, Ariz., 32 degrees north latitude)), in later tests Zephyr flew 11 days in winter conditions.

Long duration solar powered aircraft are also hampered by the relatively low energy density of regenerative batteries and regenerative fuel cells required to power the craft at night. Flying at high altitude is additionally challenging in this regard, as the low air density increases the power required for propeller driven aircraft (e.g. by a factor of 3× relative to sea level at 56,000 ft and a factor of 4× relative to sea level at 69,000 ft). Additionally, the increased dynamic viscosity at high altitude (resulting in reduced Reynolds numbers) results in reduced aerodynamic performance in terms of aircraft lift/drag ratio and propeller efficiency for slow flying aircraft.

We assume that in order for the high altitude solar powered unmanned aircraft to become a desirable alternative to the low-orbit satellite and to capture a portion of the large communication market it needs to offer:

a. a network of hundreds of aircraft on station worldwide providing continuous coverage b. an airframe of adequate ruggedness to withstand climb and descent in less than ideal weather c. a flight safety track-record documenting an ability to sustain approximately 9,000 flight hours per year per aircraft, using aircraft certified by the Federal Aviation Administration (FAA) and of other world agencies and the approval of the Air Traffic Control (ATC)

d. sufficient geographic coverage during winter e. a cost per communication data rate and per area coverage that is reasonably competitive with geosynchronous satellites.

Providing such a combination of essential aircraft attributes requires that a large and very light aircraft achieve a safety record comparable to that of current commercial airlines. While many individual technology advancements (e.g. improved battery energy density and/or solar cell efficiency) can contribute to this, it is important to combine the performance of all contributors.

A key challenge for a solar powered aircraft to provide an acceptable market entry is the ability of the aircraft to collect solar energy at low sun angles, such as in winter and early and late in the day. Prior art aircraft configurations typically utilize a flat, stretched wing, which offers high aircraft lift/drag (L/D) ratio and low power requirements. The challenge of relying on solar energy is generally addressed by: a) building ultra-light, low wing loading airframes that are not capable of surviving gusts, b) flying in mid-summer (when high sun angle provides optimal solar cell performance), c) flying in geographic locations where sun angle is high (e.g., low latitudes), d) flying at low altitude and in good weather (permitting lower speed and reduced power requirements), e) not flying through the night, and f) gliding at night using altitude gained during the day (with resulting loss of altitude), and frequently utilize a combination of these. Such approaches, however, are not viable for the intended use of replacing orbiting communications satellites.

The challenge of flight through the night can be partially addressed by use of high energy density batteries (for example, Lithium-Sulfur batteries) with energy densities of up to 220 Wh/lb. Laboratory research indicates further improvement in performance of several chemistries of rechargeable batteries are possible.

Some solar powered aircraft have attempted to address the problem of generating adequate power at low sun angles by presenting solar cells at angles that are more vertical relative to the plane of the aircraft when in level flight. U.S. Pat. No. 6,931,247 (to Cox and Swanson) discloses a lightweight solar powered aircraft configured as a flying wing, constructed as a transparent film over a lightweight frame. The wing is divided in segments that are joined by hinges, with each segment carrying motor/propeller assemblies. The hinges permit adjustment of the dihedral angles of the segments of the wing that aid in orienting solar cells mounted on the wing toward the horizon during flight. Hinge placement and orientation permit various wing configurations, including "M" and "W" configurations with both positive and negative dihedral angles. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. United States Patent Application Publication No. 2010/0213309 (to Parks) shows a similar lightweight aircraft, which includes tail booms that carry additional solar cells and wing-mounted pylons that position motor/propeller assemblies both above and below the wing. Differential thrust applied by these motor/propeller assemblies is used to adjust the pitch of the aircraft for altitude adjustment. The taught aircraft, however, utilize motive power (in the form of motor/propeller assemblies) in each wing segment, apparently as a design constraint necessitated by flexibility of the taught airframes. This increases expense and design complexity, and provides numerous opportunities for component failure.

Another approach that has been attempted to improve the efficiency of solar cell performance in aircraft flying at low sun angles is to provide a vertical surface on which solar cells are mounted. In such designs, however, the aircraft L/D ratio is necessarily reduced in proportion to the improved low sun angle collection. This results from the additional parasitic drag of vertical surfaces beyond those necessary for efficient flight, resulting in increased power requirements. In addition, such vertical surfaces can negatively impact aircraft stability in inclement weather.

Still another approach that has been attempted in the prior art is to utilize a flexible wing surface that carries solar cells. When the central portion of the wing is weighted (for example, through carrying batteries or payload) the downwards inflection of the flexible wing produces a curve that angles a portion of the solar cells towards the horizon. An example of such a design is the aforementioned Helios aircraft. Bending of the aircraft's flexible wing combined with a built-in 5 degrees dihedral of the outboard wing sections provided adequate solar energy collection during flight at the relatively high sun angles provided by performing the flight test in August at a low latitude (i.e. Kauai, which lies at 22° N latitude). Unfortunately, as demonstrated by the loss of Helios aircraft due to weather, such a flexible wing does not provide an aircraft that is sufficiently rugged for long duration flight.

Thus, there is still a need for solar powered aircraft that can provide consistent long duration flight times at high altitudes and high latitudes.

SUMMARY OF THE INVENTION

The inventive subject matter provides apparatus, systems and methods that provide a solar powered aircraft capable of long duration flights at high altitude and in latitudes greater than 30° N and 20° S. The aircraft is of rigid, molded construction, and includes a segmented wing. Individual wing segments are joined by hinges adjustable to positive and negative dihedral angles during flight. This permits orientation of photovoltaic cells towards the horizon when the sun is at a low angle, thereby increasing the efficiency of the photovoltaic cells. The aircraft's molded construction provides sufficient rigidity to permit the aircraft to fly through inclement weather conditions. Reliability and safety in long duration flights is further increased by reliance on free flight (with no active control) for greater than 90% of the flight, which reduces wear on active control surfaces. Aircraft of the inventive concept are capable of flight durations of 2 months to 5 years at altitudes in excess of 50,000 feet and at latitudes between 40° N BS 30° S.

Such an aircraft can include an on-board controller that is programmed to provide autonomous flight of the aircraft under both slow response (such as a roll trim function) and rapid response if required for stabilizing the aircraft in gusts. Slow response conditions include steady flight under normal weather conditions at cruising altitude. Free flight is utilized under slow response conditions, where free flight control may not utilize control surfaces but rather utilizes changes in propeller speed to control the aircraft. Rapid response conditions include takeoff, landing, inclement weather, and rapid course corrections transmitted from the on-board controller or a remote operator. Active flight control utilizes control surfaces that are coupled to actuators. The controller is programmed to optimize the use of active control to minimize the duty cycle of the actuators, thereby reducing the chances of mechanical failure. The controller can utilize sensor data and/or input from an external source to determine if slow response or rapid response conditions exist.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 4A shows the aircraft with the wing segments held in an essentially horizontal position. FIG. 4B shows the aircraft with the wing segments held in a partially flexed position to provide dihedral and anhedral angles for increased efficiency of solar energy collection. FIG. 4C shows the aircraft with the wing segments held at a greater degree of flexion.

FIG. 5A shows an orthogonal view of the aircraft. FIG. 5B shows a top-down view of the aircraft, showing a swept wing design.

FIG. 5C depicts a hinge joining an inboard lateral wing segment and an outboard lateral wing segment, and includes an inset showing the position of the hinge when the wing is angled. FIG. 5D depicts a hinge joining an inboard lateral wing segment to the central segment of the aircraft.

FIG. 6A shows various positions of a simple control surface associated with an airfoil and coupled to an actuator. FIG. 6B shows various positions of a split control surface associated with an airfoil and coupled to an actuator.

FIG. 9A shows bending stiffness. FIG. 9B shows torsional stiffness.

DETAILED DESCRIPTION

The following description includes information that may be useful in understanding the present invention. It is not an admission that any of the information provided herein is prior art or relevant to the presently claimed invention, or that any publication specifically or implicitly referenced is prior art.

Figure 1:
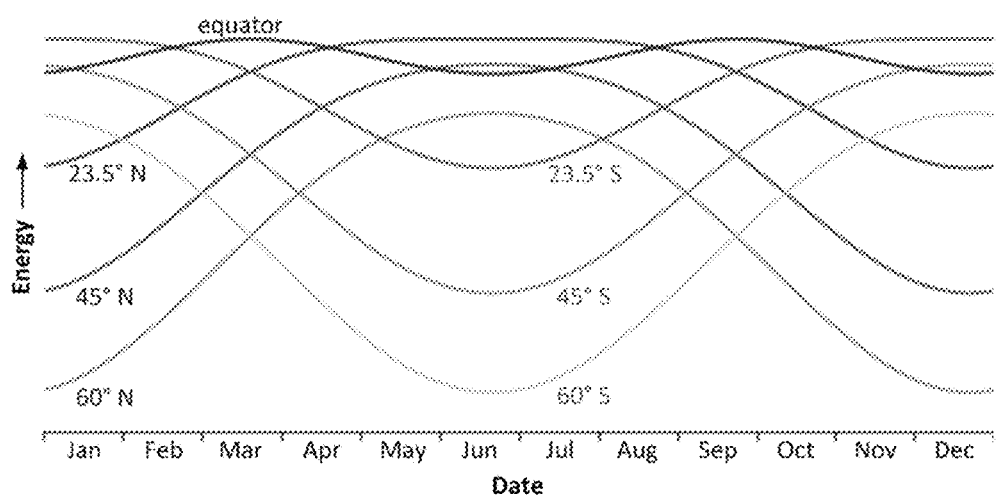
FIG. 1 depicts solar energy availability at different latitudes throughout the year.
Figure 2A:
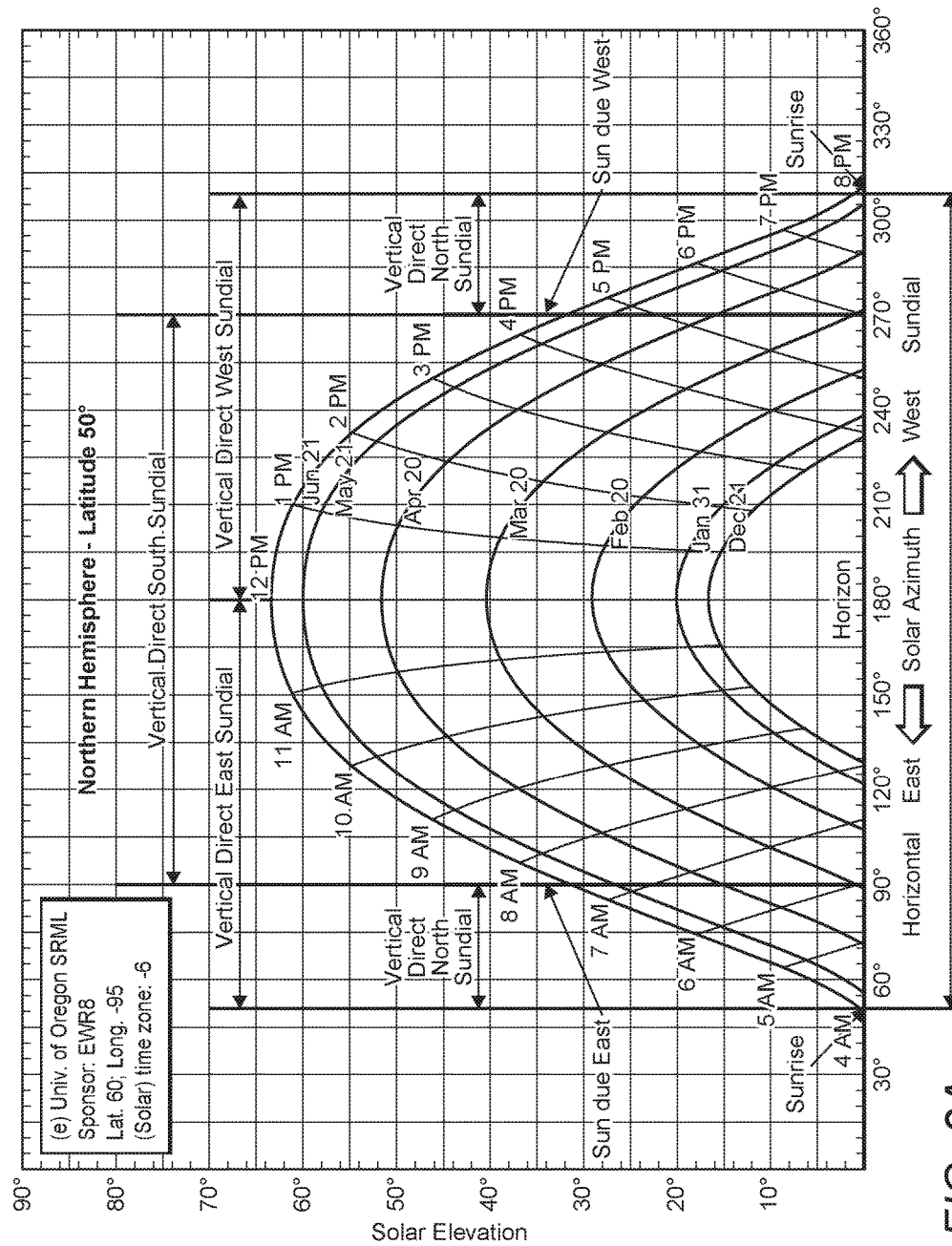
FIG. 2A depicts solar elevation at different times of the day at 50° N latitude at different times of the year.

High altitude, long flight endurance aircraft present an attractive alternative to satellites in telecommunications networks. One obstacle to the development of these is a power source that can sustain uninterrupted flight for weeks, months, or years without the need for active refueling. Solar power provides a potential solution, but presents challenges beyond the obvious day/night cycle. As shown in FIG. 1 the solar energy available in kilowatt per square meter varies as a function of time of year and geographical elevation (i.e. latitude). It is apparent that in the stratosphere (i.e. above the weather) significant solar energy is available in mid-winter at elevations of 39.3 degrees north (4 kWh per day per square meter over Stuttgart) and even at 48.8 degrees (2.5 kWh per day per square meter over Berlin). However, photovoltaic cells provide optimal performance when the sun angle is essentially perpendicular to the photovoltaic cell's surface. As shown in FIG. 2A sun angles are shallow early and late in the day. This is especially true in winter at latitudes north of 35° N latitude and south of 35° S latitude, which renders solar cells on horizontal surfaces (such as aircraft wings) ineffective for energy collection.

Another challenge to the viability of solar powered aircraft is wind at the intended operational altitudes. Even at the relatively low wind speeds experienced at 65,000 ft, the wind over many geographical locations of interest for telecommunications relay can be greater than the flight speed of conventional current solar powered aircraft at that altitude. Additionally, it should be appreciated that aircraft speed can be required to be significantly higher than wind speed in order to be able to direct the aircraft's solar panels toward the sun.

Aircraft speed for best lift/drag ratio (i.e. the best range speed for propeller-driven aircraft) is proportional to the square root of the aircraft's wing loading (aircraft weight divided by wing area). The aircraft speed for minimum cruise power, which is preferred for best endurance, is lower than that for best range. In order to achieve flight at high altitude, prior art solar powered unmanned aircraft minimize the power required for flight by being very slow, very light, and having a large wing area that results in low wing loading and low speed at altitude. The wing loadings of the most successful prior art solar powered aircraft are 0.22 lb/ft2 (psf) for the QinetiQ (now Airbus) Zephyr 6, 0.36 psf for Zephyr 7, and 0.81 psf for the AeroVironment Helios, which produced estimated speeds at 70,000 feet of 30 knots, 50 knots and 70 knots respectively.

Advances in photovoltaic cell efficiency and energy storage device performance can offset these issues to some extent. However, even with benefits of the rapidly advancing technologies of regenerative batteries in terms of energy density (kWh/Lb at long cycle life) and of solar cells in terms of collection efficiency (percent of solar energy converted to electric power), conflicts persist between the design constraints of a payload-carrying aircraft and the use of solar power. Examples of such conflicts include:

a. Minimizing battery and/or fuel cell weight fraction (battery weight and cells weight divided by total aircraft weight) while maximizing energy storage capacity.

b. High cruise speed at high altitude is required to maintain position against high winds, which demands high cruise power (high propulsion system weight) and/or a combination of high wing loading and high L/D ratio, while minimizing aircraft weight is desirable.

c. Reliable and safe ascent and descent of the aircraft in non-ideal weather requires a more robust airframes and higher wing loading than what has been achieved in prior art high altitude solar powered aircraft and can require measures to reduce wing bending in gusty weather that are not accommodated by traditional light weight structural components.

d. At a given aircraft weight higher wing loading is achieved by reducing the wing area, which both reduces the area available for solar cells and reduces the glide ratio (L/D) and results in increased cruise power requirements e. At a given altitude and energy storage density the endurance of aircraft cruise through the night using only stored power (which defines the maximum available operational latitude in winter) depends on achieving low cruise power at night and high collection of energy during the day (in excess over that needed for day cruise), both of which require a large wing and low wing loading.

f. High aircraft L/D ratio is best achieved with a flat wing (no dihedral or anhedral) having a high aspect ratio (ratio of span to average chord) and a large wing with a small fuselage and tail similar to the configuration of competition sailplanes. Power collection at low sun angle, however, requires solar cell orientation towards the sun at low angles and therefore a combination of dihedral, anhedral and vertical surfaces all of which result in high parasite or induced drag and in lower L/D ratio and higher required power for cruise at night.

Embodiments of the inventive concept include autonomous solar powered aircraft configured for long endurance (i.e. greater than 2 months) flight at high altitudes (greater than 50,000 feet) at high latitudes (i.e. greater than 20° N and 20° S latitude). The aircraft is well suited for carrying a payload of telecommunications equipment (for example, transmitters and/or receivers) and can act as a telecommunications relay within a telecommunications network when so equipped. Unlike prior art solar powered aircraft. Aircraft of the inventive concept are of rigid construction that is resistant to deformation under stress. Such aircraft can include a swept lifting surface, for example a swept wing. The inventors have that such a swept lifting surface is effective in controlling pitch and damping pitch oscillations (and thereby passively improving aircraft stability). The wing of the aircraft supports photovoltaic cells for power generation, and is segmented. Hinges between the wing segments permit positive and negative dihedral adjustment that permits orientation of photovoltaic cells towards the horizon for effective collection of solar energy at low sun angles.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary. The recitation of ranges of values herein is merely intended to serve as a shorthand method of referring individually to each separate value falling within the range. Unless otherwise indicated herein, each individual value with a range is incorporated into the specification as if it were individually recited herein.

As noted above, unlike prior art designs the aircraft is of rigid construction, with flight surfaces constructed from rigid molded and/or laminated materials. Such an aircraft can include active control surfaces, and can include a controller that utilizes free flight control under slow response conditions (such as cruising at altitude under calm weather conditions and/or directed gradual course changes) and active control utilizing actuator-driven control surfaces under rapid response conditions (such as takeoff, landing, inclement weather, and directed rapid course changes). The controller can adjust the dihedral angle of the wing segments, and can direct active control surfaces via actuators. The aircraft can be inherently stable and the controller programmed to minimize the use of active control surfaces in order to minimize wear and improve safety and reliability in long flight duration.

It should be appreciated that designers of solar powered aircraft face design conflicts between the wing geometry needed for efficient collection of solar energy, the wing geometry needed for efficient aerodynamic flight, the need for low aircraft weight, structural robustness required for tolerance of weather, and system robustness required for extended flight times. Nearly all known solar powered aircraft utilize the large, essentially flat surface of the main wing as a mounting site for large-area solar panels used to gather energy for flight. A conflict arises between the different orientations required for this large surface to function in its dual roles as energy collector and lift generator. Efficient collection of solar energy requires solar panels oriented in a direction as nearly normal as possible to the direction of incoming sunlight. When the sun is low in the sky (as is the case at high latitudes, especially in winter, and is the case both in the morning and evening at all latitudes and seasons) this requires large surfaces held in a close-to-vertical orientation.

Figure 2B:
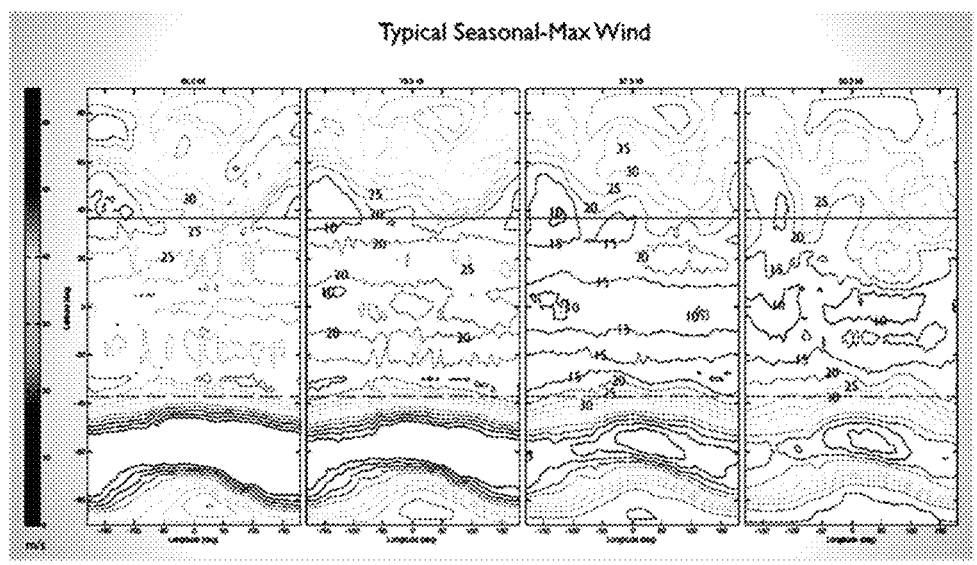
FIG. 2B depicts maximum seasonal wind speeds at different longitudes and latitudes.

Conversely, the efficient aerodynamic performance necessitated by the relatively low energy density provided by sunlight and the limited collection area requires a broad wing span, oriented normal to the local direction of gravity (i.e. parallel to the horizon). Except when the sun is very high in the sky, these two requirements are conflicting. The present invention resolves this conflict by providing a hinged wing surface which is able to adapt the orientation of its surfaces depending on operating conditions. During night-time hours, or during daylight hours when the sun is high in the sky, the wing is configured as a flat, horizontal, broad-span, efficient lifting wing. When the sun is low in the sky, portions of the wing fold to orient larger panels more normal to the sun. In such conditions, the folded wing is less aerodynamically efficient, but the augmented efficiency in solar collection capability results in a positive total change in excess power available. In addition, the disclosed designs provide a robust airframe that supports central placement of a single or small number of motor/propeller assemblies (thereby simplifying design and reducing the opportunities for component failure) while providing the aircraft with the ability to withstand prevailing winds and inclement weather. As shown in FIG. 2B, which illustrates typical seasonal maximum wind speeds at different latitudes, prevailing wind speeds can increase with increasing latitude and present a further limitation to the use of conventional 'gossamer' construction of solar powered aircraft in such areas.

All known solar powered airplanes are limited in the northern and southern latitudes at which they can operate, especially during winter months when daylight is available for significantly less than half of the day and the sun remains at a low throughout. These limitations result from the inability of horizontally-oriented solar panels to collect sufficient energy due to highly sub-optimal orientation for efficient collection. The present invention enables solar powered flight at higher latitudes than previously possible (for example, up to and/or beyond 40° N latitude and 30° S latitude) by providing an adaptable wing that is able to both fly with maximum aerodynamic efficiency during the longer night time hours, as well as take best advantage of the availability of sunlight during the limited hours when it is available.

Solar powered aircraft of the inventive concept include one or more energy storage devices that can store excess energy gathered during daylight hours for use under low-light conditions. Such energy storage devices preferably are light weight, have high energy storage capacity, and are capable of sufficient charge/discharge cycles to sustain flight durations of months to years. Suitable energy storage devices include rechargeable batteries, fuel cells (for example, a hydrogen fuel cell fueled by products of electrolysis), and/or capacitor banks. An aircraft of the inventive concept can use more than type of energy storage device.

In some embodiments of the inventive concept the wing is a swept-wing design, positioned at an angle relative to the direction of travel. In some embodiments the aircraft is a 'flying wing' design, lacking a tail. Alternatively, in some embodiments the aircraft includes a tail which can serve, at least in part, as a lifting surface. Generally such swept designs are considered unnecessary for low speed flight. In an all-wing designs swept wings improve pitch control effectiveness and damping of pitch oscillations that reduces the need to rely on active control surfaces (thereby increasing aircraft safety and reliability in long endurance flights) while still providing adequate lift at acceptably low aircraft weight. In some embodiments the sweep angle is about 5°, about 7.5°, about 10°, about 12.5°, about 15°, about 17.5°, about 20°, or greater than 20°.

Another design constraint of high altitude long endurance solar powered aircraft is weight. The low weight requirements of solar powered aircraft have resulted in prior art designs that sacrifice structural stiffness and strength for weight. For example, prior art solar powered High Altitude Long Endurance (HALE) aircraft are generally gossamer (i.e. very light and delicate) in nature, and are constructed from lightweight polymer film stretched over minimal lightweight frameworks. Some of the most successful were developed by AeroVironment, Inc., which also developed the record breaking and highly publicized man-powered aircraft Gossamer Condor and Gossamer Albatross. Such solar powered HALE aircraft are typically launched and recovered at carefully selected times and locations in order to assure near-perfect calm weather. Unfortunately, weather prediction is often not adequately precise. For example, the solar powered Helios was lost due to gusty weather, which resulted in deformation of the aircraft that ultimately led to structural failure. The fragility of solar powered HALE aircraft is a result of at least the following design and operational constraints:

a. very low structural weight fraction (weight of structure divided by gross weight)
b. very low structural wing loading (weight of structure divided by wing area or divided by total lifting area)
c. low maximum limit maneuver load (n, maximum lift divided by gross weight)
d. very low limit dynamic pressure (½ times air density times (airspeed))
e. very low maximum landing descent rate.

Such constraints render such designs useless for year-round extended, high altitude flight at high altitudes (i.e. 50,000 feet or higher). It should also be appreciated that the "cube-square law" (which dictates that weight increases geometrically as aircraft dimensions increase) must be considered when contemplating such aircraft. While gossamer design can be suitably rugged for small aircraft, aircraft of a size that is practical for use in a telecommunications relay network require substantially different construction in order to withstand normal operating conditions.

The inventors have found, surprisingly, that rigid aircraft can be constructed that can be sufficiently light for use with solar power while providing rigidity necessary for long duration flight. The current invention can use precision molds to manufacture all outer mold line (OML) skins of a composite airframe. This provides the required precision airfoils for high L/D performance at low Re numbers, and advantageously reduces labor hours required for manufacturing of the aircraft in high quantity production. This is distinct from prior art solar powered aircraft, which have used open airframes of spars and ribs covered by thin plastic film to minimize weight. Thin-film solar cells can be conveniently and permanently integrated with the aircraft skin during manufacturing in such wing skin molds.

Typically, the manufacturing process begins with empty molds that can be treated with a mold-release agent. A thin, clear protective coating is first laid in the mold, followed by thin-film solar cells (i.e. photovoltaic cells) arranged in panels. Such solar panels can be flexible (so as to conform to the mold's shape) or provided as rigid panels that are pre-formed to configure to the mold. Surface wiring is then applied, followed by the structural layers of the molded composite skin.

Composite materials suitable for use in structural portions of the aircraft can include a resin (for example, a polyester, a polyurethane, a phenolic, a polyamide, a polyimide, and/or an epoxy) and a fiber or reinforcing component, and can include a catalyst or curing agent. Suitable reinforcing components include carbon (for example, carbon fiber, graphite, and/or carbon nanotubes), aramid (aromatic polyamide) fibers, and/or glass fibers. Fibers used as reinforcing components can be in the form of tows, yarns, rovings, chopped strands, and/or woven fiber mats or sheets. Such fibers can be characterized as high modulus fibers or intermediate modulus fibers, depending on their tensile strength and tensile modulus. High modulus fibers generally have a tensile strength ranging from about 700 to 1000 KSI and a tensile modulus ranging from about 30 MSI to about 45 MSI. Intermediate modulus fibers generally have a tensile strength ranging from about 600 to about 700 KSI and a tensile modulus ranging from about 50 to about 85 MSI. Fibers and/or combinations of fibers (for example, high modulus and/or intermediate modulus fibers) can be selected to provide the necessary combination of stiffness and toughness for the composite material. It is contemplated that different composite compositions can be utilized in different portions of the aircraft. For example, composites utilized at leading edges can differ from those selected for use on trailing edges and/or control surfaces.

Molded panels of such composite materials can be secured to spars that provide internal structure to provide rigid, high precision aerodynamic surfaces. Spars are preferably constructed of rigid, lightweight composite materials, however the use of lightweight metals and alloys for all or a portion of spar construction is also contemplated.

Figure 9A:
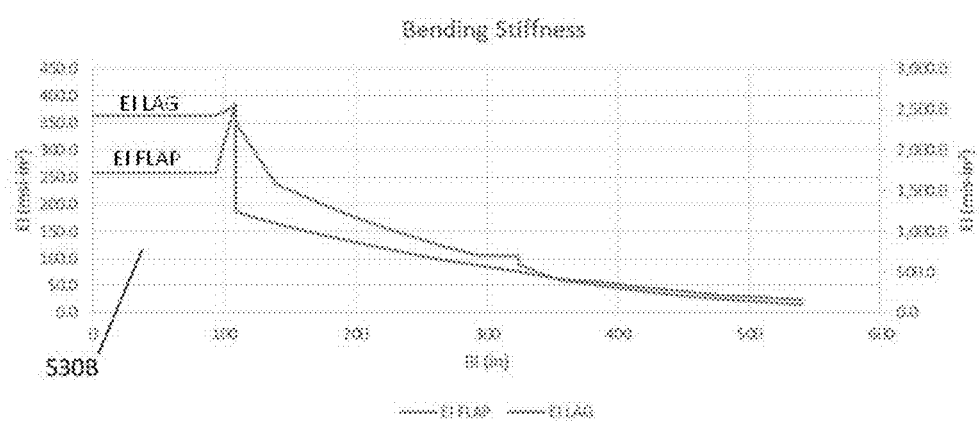
FIGS. 9A and 9B depict stiffness of a wing of an aircraft as depicted in FIG. 4A.
Figure 9B:
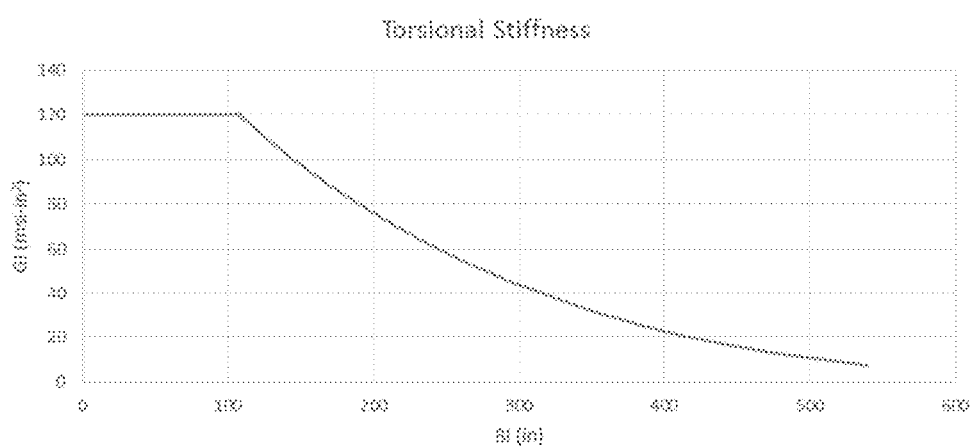

Use of such composite materials provides an aircraft of the inventive concept with sufficient stiffness to adequately resist deformation due to stresses that can occur during takeoff, landing, and long duration flight at high altitude. Examples of bending stiffness and torsional stiffness of the wings of aircraft of the inventive concept are shown in FIGS. 9A and 9B, respectively. Such stiffness can be characterized by the natural frequency of the aircraft wing as a function of the size of the wing. In some embodiments of the inventive concept the aircraft can include a tail. In such embodiments the natural frequency that can be greater than or equal to 0.65 Hz times (100 ft/wing span, ft)$^{1.5}$, greater than or equal to 1.3 Hz times (100 ft/wing span, ft)$^{1.5}$, or greater than or equal to 2.6 Hz times (100 ft/wing span, ft)$^{1.5}$. In other embodiments of the inventive concept the aircraft can have a flying wing design, and thus lack a tail. In such embodiments the natural frequency that can be greater than or equal to 1.6 Hz times (100 ft/wing span, ft)$^{1.5}$, greater than or equal to 3.2 Hz times (100 ft/wing span, ft)$^{1.5}$, or greater than or equal to 5 Hz times (100 ft/wing span, ft)$^{1.5}$.

Figure 4A:
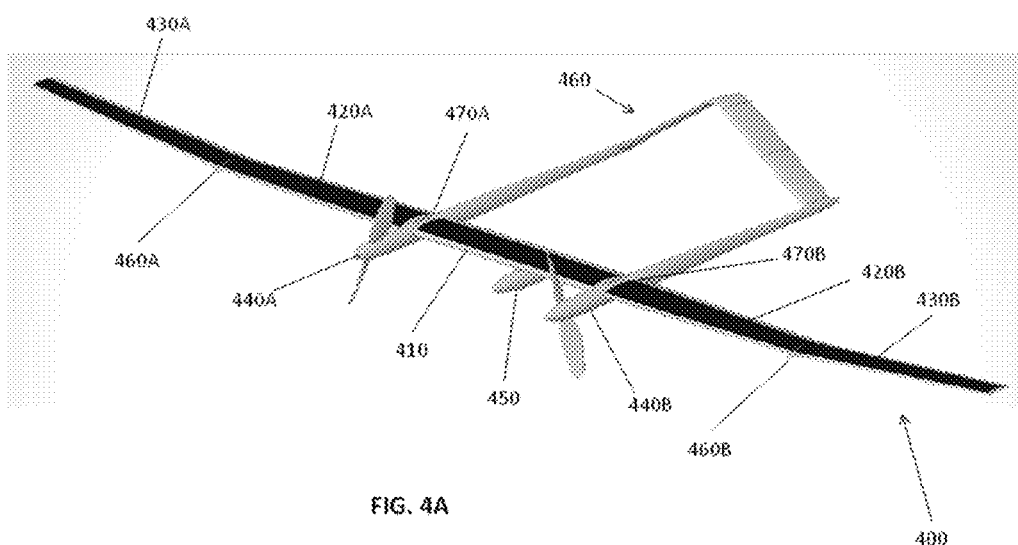
FIGS. 4A to 4C depict an embodiment of an aircraft of the inventive concept that includes a boom-mounted tail.
Figure 4B:
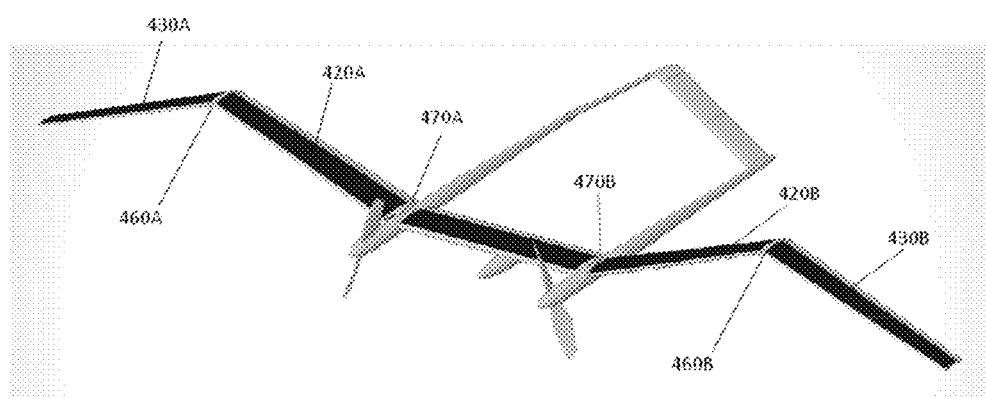
Figure 4C:
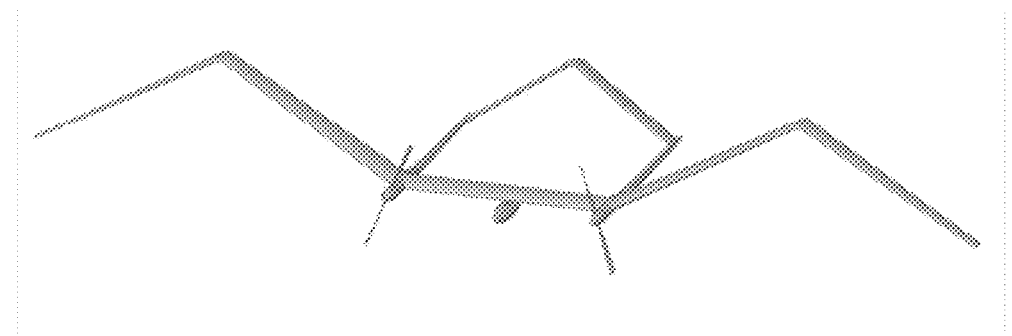

An example of an aircraft of the inventive concept is depicted in FIG. 4A to 4C. FIG. 4A shows the aircraft with the wing in an essentially straight orientation, as would be used at night or at midday. As shown the aircraft includes a segmented wing 400 that includes a central segment 410 and inboard and outboard lateral wing segments (420A, 420B, 430A, 430B). As shown, photovoltaic cells are arranged in panels on the upper wing surface. The central segments supports to motor-propeller assemblies (440A, 440B) and a payload 450. As shown, hinges (460A, 460B) couple inboard wing segments (420A, 420B) to outboard wing segments (430A, 430B). Similarly, hinge assemblies (470A, 470B) couple inboard lateral wing segments (420A, 420B) to the central segment 410. In a preferred embodiment the payload can include a telecommunications transmitter/receiver. As shown, this embodiment includes a boom mounted tail. It should be appreciated that such an aircraft can include a landing gear, which is not visible in this view.

FIG. 4B shows the same aircraft with the hinges (470A, 470B) positioned to provide a negative dihedral for inboard wing segment 420A and 420B. Similarly, hinges (460A, 460B) are positioned to angle the outboard wing segments 430A and 430B at a positive dihedral. In this position a portion of the photovoltaic cells towards the horizon, as they would be at lower sun angles (for example, morning or evening). FIG. 4C shows the aircraft with the wing segments positioned at a greater angle than that depicted in FIG. 4B.

Figure 5A:
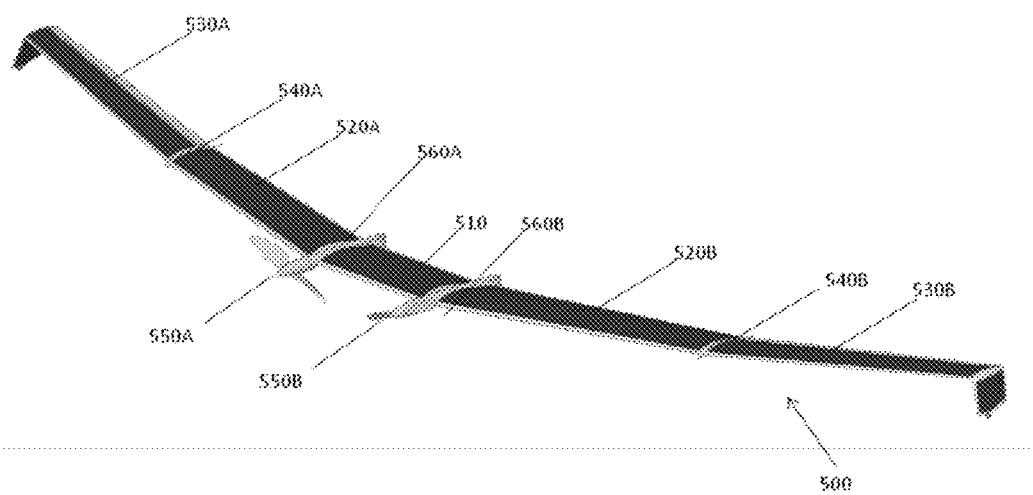
FIGS. 5A and 5B depict a flying wing embodiment of an aircraft of the inventive concept (i.e. one that does not include a tail).
Figure 5B:
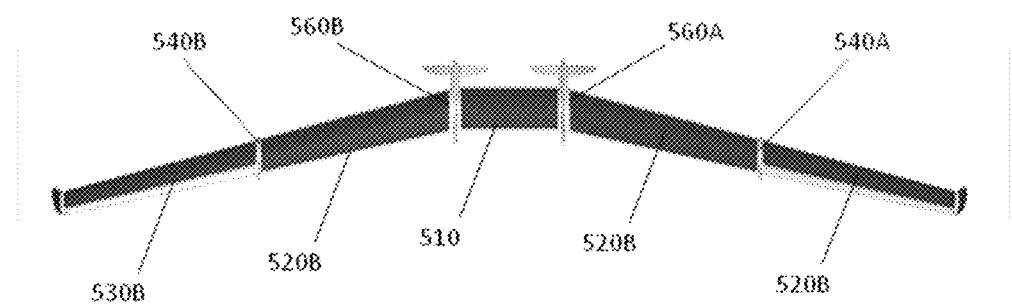

FIGS. 5A and 5B depict a flying wing embodiment of an aircraft of the inventive concept. FIG. 5A shows an orthogonal view of the aircraft, which has a segmented wing 500 that includes a central segment 510, inboard lateral wing segments (520A, 520B), and outboard lateral wing segments (530A, 530B). Inboard lateral wing segments (520A, 520B) are joined to outboard lateral wing segments (530A, 530B) by hinge assemblies (540A, 540B). Similarly, inboard lateral wing segments (520A, 520B) are joined to the central segment 510 by hinge assemblies (560A, 560B) Photovoltaic cells are arranged in panels on the upper surface of the segmented wing. The hinges joining the wing segments permit flexion of the wing in a fashion similar to the embodiment shown in FIGS. 4A to 4C. The central segment is shown supporting a pair of motor-propeller assemblies (550A, 550B). FIG. 5B shows a top-down view of the aircraft, showing that wing segments 520A, 530A, 520B, and 530B are angle back in the direction of travel relative to the central segment 510 in a swept wing configuration.

Figure 5C:
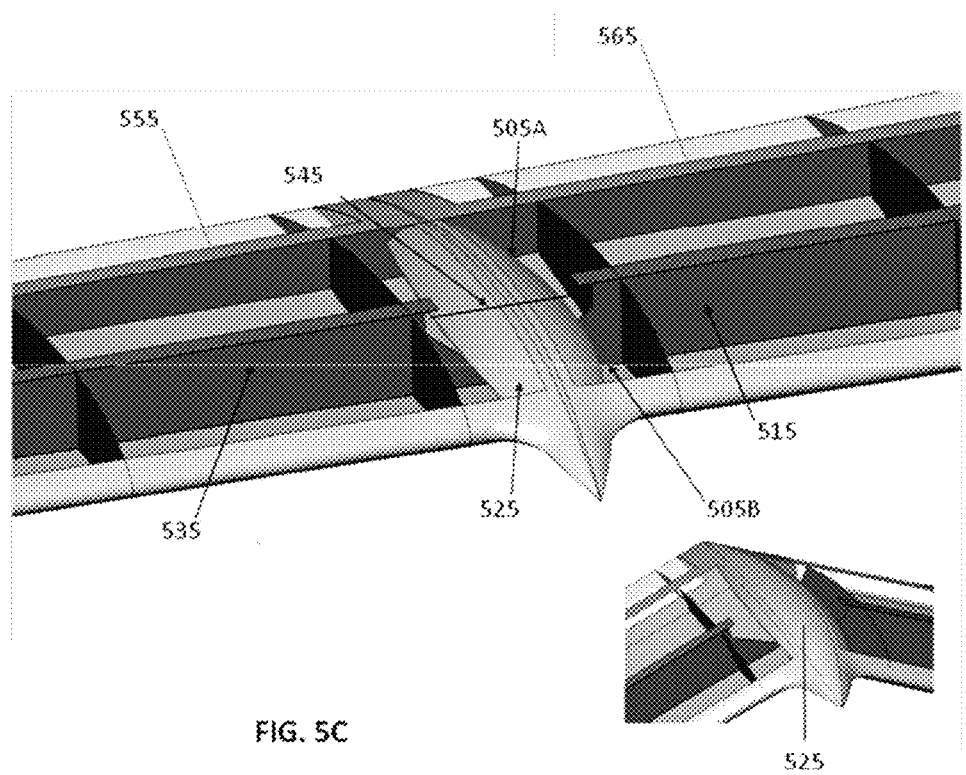
FIGS. 5C and 5D depict hinges utilized in joining wing segments.

A more detailed view of a typical hinge assembly joining an inboard wing segment to an outboard wing segment is shown in FIG. 5C. The wing segments are shown with the rigid molded skin rendered transparent. The forward spar of the inboard lateral wing segment 515 and the forward spar of the outboard lateral wing segment 535 support a hinge 505B that lies below a clamshell faring 525. A similar hinge 505A is associated with the rearward spars (555, 565) of the wing segments. A linear actuator 545 is also located below the clamshell faring 525. An inset depicts a portion of the wing when flexed, and shows how the clamshell faring retain aerodynamic contour on flexion between the inboard and outboard wing segments. Suitable linear actuators include rotary electric motors with suitable gearing, pneumatic actuators, hydraulic actuators, and linear motors.

Figure 5D:
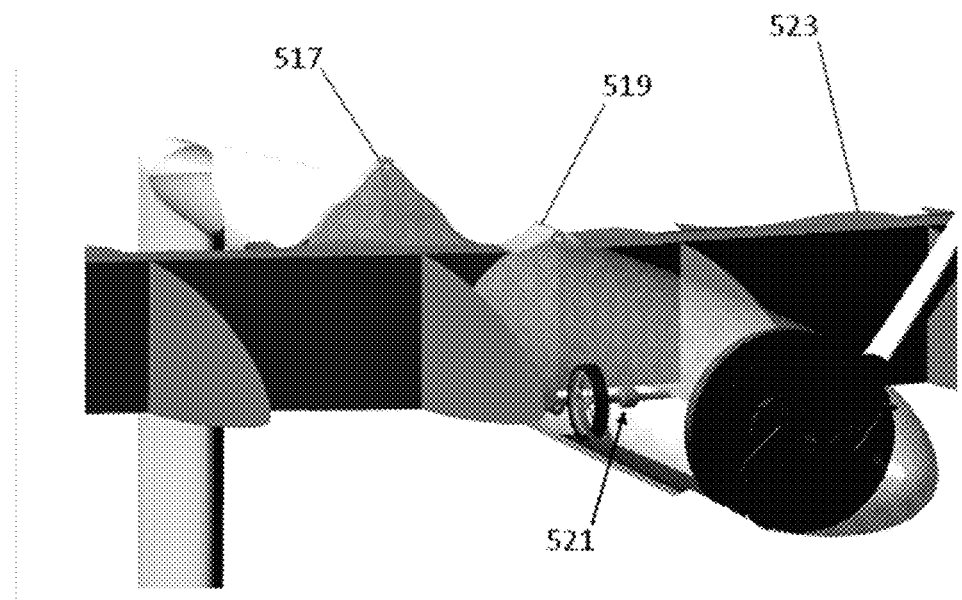

Similarly, FIG. 5D shows a more detailed view of a hinge assembly joining an inboard wing segment to the central segment 523 of a typical aircraft of the inventive concept. Hinges 517 and 519 associated with fore and aft spars of the central segment 523 and an associated inboard lateral wing segment provide flexion, which is in turn controlled by a linear actuator 521. Suitable linear actuators include rotary electric motors with suitable gearing, pneumatic actuators, hydraulic actuators, and linear motors.

Figure 7:
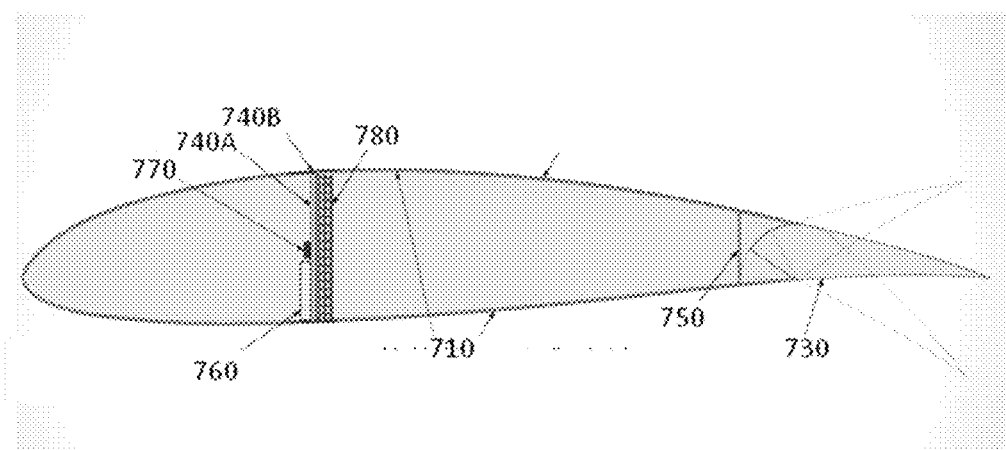
FIG. 7 depicts a cross section of a wing segment of an aircraft of the inventive concept.

It should be appreciated that the molded composite nature of the wing structures of aircraft of the inventive concept can provide for a rigid and robust internal space within the wing segments for placement of various components necessary for aircraft operation. A cross section of a wing segment of an aircraft of the inventive concept is shown in FIG. 7. As shown, a molded composite wing skin 710 has an interior supported by a fore spar web 740A and its associated spar cap 740B and an aft spar web 750. The fore spar web can serve to support a battery (or similar power storage device) 780, electronics packages used in photovoltaic cell and battery power management 760, and a power bus 770. As shown, the wing structure can also include a control surface 730.

Figure 8:
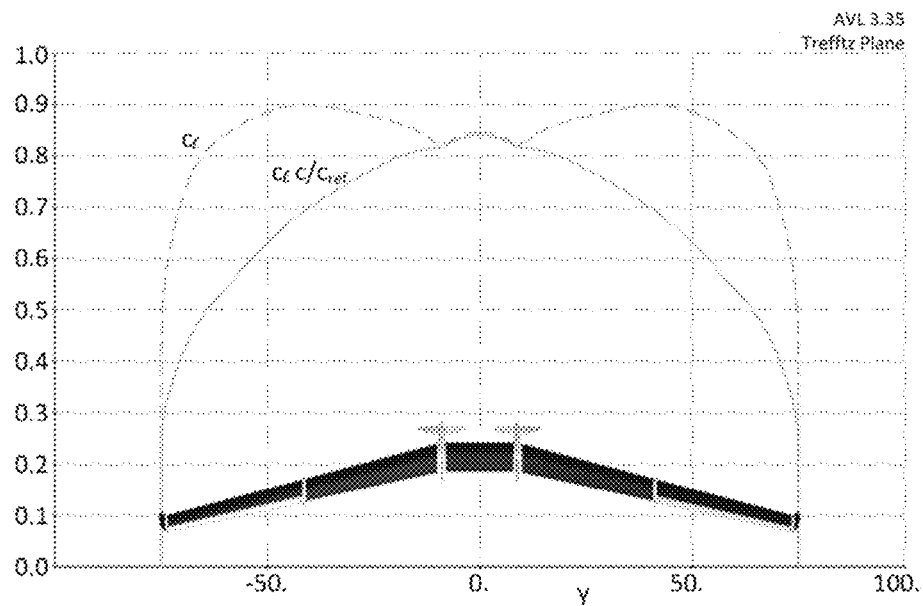
FIG. 8 depicts mass distribution across an aircraft as depicted in FIG. 5A.

The relative lack of structural rigidity in prior art solar powered aircraft also results in a requirement to distribute weight along the length of the wing. Such prior art solar powered aircraft, therefore, typically distribute a number of motor and propeller assemblies that provide thrust along the length of the wing. The structural rigidity of aircraft of the inventive concept, however, advantageously permits localization of one or more motor and propeller assemblies to a single (for example, central) portion of the aircraft. A reduced number of larger propellers has the advantage of higher aerodynamic performance due to higher Reynolds numbers. An example of a typical mass distribution for an aircraft of the inventive concept is shown in FIG. 8. For example, in an embodiment of the inventive concept utilizing two or more motor and propeller assemblies, more than half of these can be located at a centrally placed portion or segment of the aircraft. In a preferred embodiment the aircraft can utilize two motor and propeller assemblies, both coupled to a central segment of the aircraft and flanked by lateral wing segments that do not carry motor and propeller assemblies. Use of a smaller number of motor and propeller assemblies represents a savings in weight and can simplify control. In order to increase aircraft reliability and further reduce weight, such motor and propeller assemblies can be arranged so that power is transferred from the motor to the propeller directly, without the use of intervening gears (for example, using an iron-less, brushless, ring form electric motor). In a preferred embodiment the aircraft has two motor-propeller assemblies, which provides redundancy in the event of motor failure and/or propeller damage. In some embodiments propellers can have a diameter ranging from 6 feet to 12 feet or more, and can operate in a range from 50 rpm to 1,500 rpm, 100 rpm to 1,000 rpm, or 175 rpm to 700 rpm It should be appreciated that such a rigid airframe also permits the inclusion of a landing gear on aircraft of the inventive concept. In some embodiments such landing gear permit the aircraft to launch from the ground or other suitably level surface. In other embodiments the aircraft is launched from a catapult, cradle, or similar device and the landing gear are deployed for landing. In preferred embodiments the landing gear are retractable. Alternatively, aircraft of the inventive concept can include a landing skid.

Characteristics of exemplary airfoils useful in wing segments and/or tail portions of aircraft are shown in Table 1.

TABLE 1

| Airfoil | Chord | Thickness Ratio | Incidence (degrees) | Re (at 63,000 ft) |
|---|---|---|---|---|
| LR0316a | 5 | 16% | 3 | 310,000 |
| LR0314a | 3.75 | 14% | 4 | 230,000 |
| LR0510a | 2.5 | 10% | 0.5 | 150,000 |

It should be appreciated that the aircraft wing is segmented, with individual segments joined by hinges, and that the airfoils present have low Reynolds numbers (for example, a Re of 155,000 at the wing tip). The entire aircraft is designed for low Reynolds number flight at high altitude with narrow chords and low cruise speeds. In this embodiment the aircraft has a straight wing measured from the 33% chord stackline. Airfoils were designed for operation between a lift coefficient (CL) of 0.5 and 1.2, and different airfoil configurations can be utilized in different wing segments. For example, LR03 series airfoils can be used for the wing center to the outboard hinge point, and are optimized to balance low Reynolds number performance with wing strength and stiffness to weight ratios. LR05 series airfoils can be used for the wingtip to achieve the desired CL range at low Reynolds number.

Figure 3:
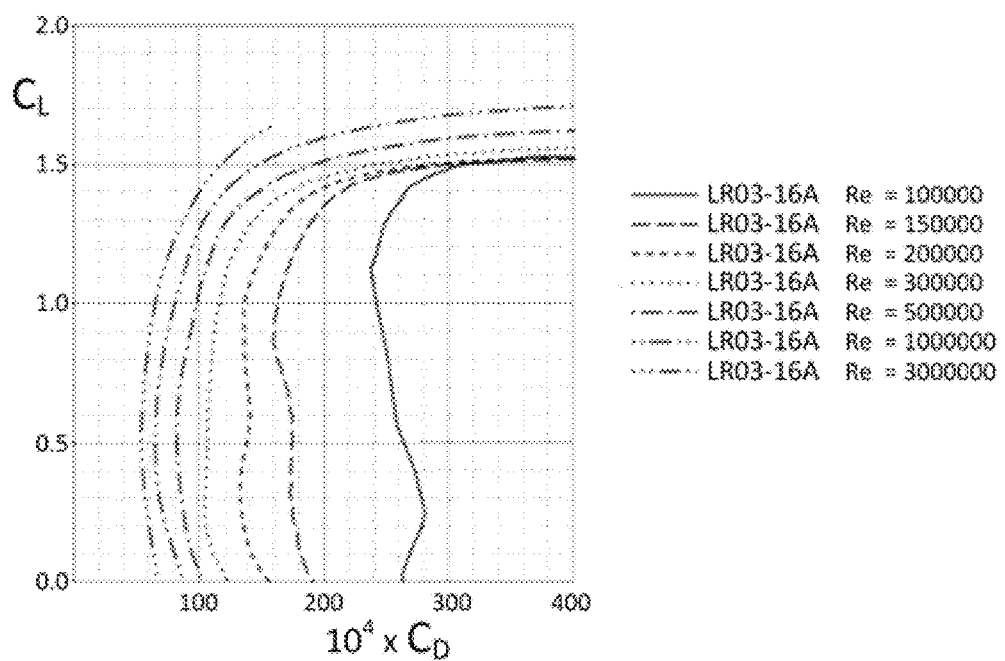
FIG. 3 shows the relationship between drag and Reynolds number (Re) for an airfoil.

As shown in FIG. 3, for a given airfoil, drag increases with decreasing Reynolds number. This occurs more rapidly below Re of 200,000. The trend shown is for the 16% thickness wing root airfoil operating at Reynolds numbers between 100,000 and 3,000,000. To maintain a desired low drag coefficient at CL=1, thickness can vary with Reynolds number. For this reason, a 10% thickness airfoil can be used at the low Reynolds number tip, whereas a 16% thickness airfoil can be used at the root where Re is above 300,000.

Aircraft of the inventive concept can include control surfaces, which can be coupled to actuators that permit such control surfaces to be deflected to control the aircraft. Such control surfaces can be associated with a wing, a tail, or both. Examples of control surfaces include ailerons and rudders. In some embodiments of the inventive concept, the pitch of one or more propeller blades can be controlled; in such embodiments the propeller blade can be considered as a control surface. As moving parts such control surfaces and their associated actuators are subject to wear, which can lead to mechanical failure and subsequent loss of the aircraft. While this can be reduced by utilizing more robust components and/or providing redundant components such approaches add weight.

Figure 6A:
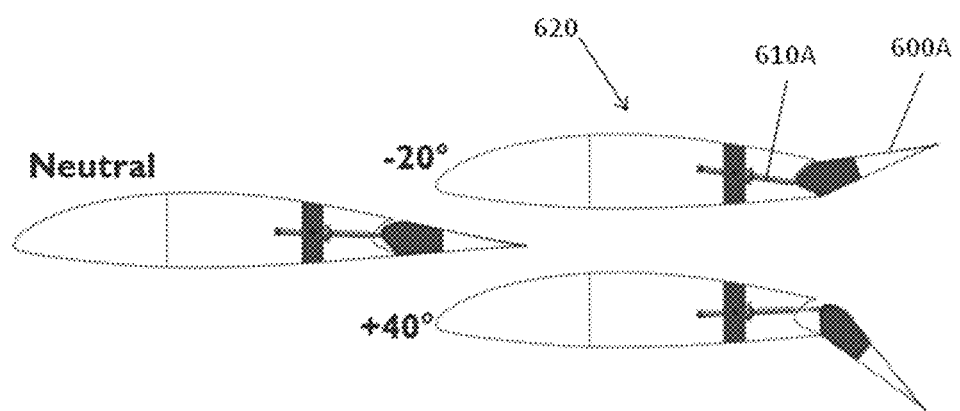
FIGS. 6A and 6B depict control surfaces utilized by an aircraft of the inventive concept.
Figure 6B:
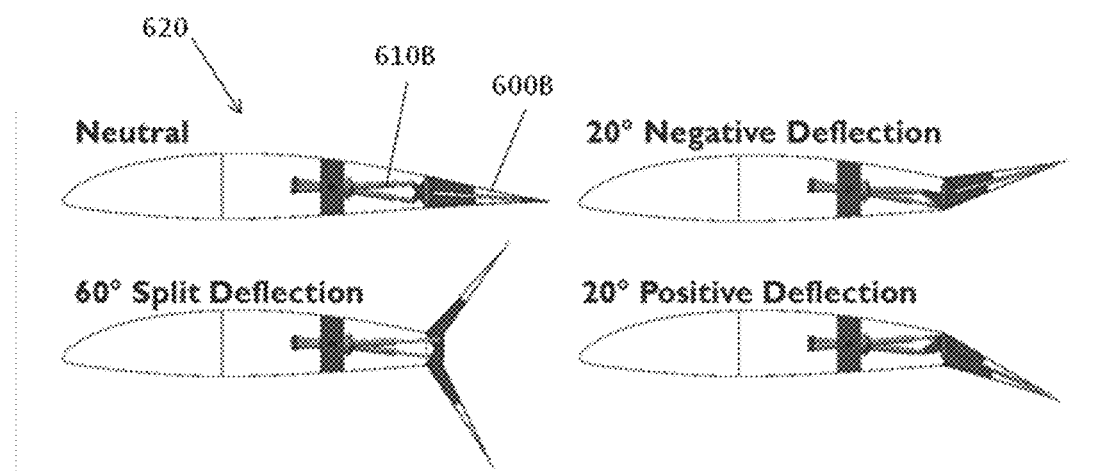

Examples of suitable control surfaces are shown in FIGS. 6A and 6B. FIG. 6A shows various positions for a control surface 600A that is coupled to an actuator 610A. As shown, depending on the effective length of the actuator the control surface can be deflected upwards or downwards to provide rapid changes to the aerodynamic properties of the associated lifting surface 620. An alternative control surface is shown in FIG. 6B, which shows various positions for a split control surface 600B that is coupled to an actuator 610B. As shown, both portions of the split control surface can be moved in concert to provide an upwards or downwards deflection (similar to the control surface shown in FIG. 6A). As shown, however, such a split control surface can also provide split deflection by moving the portions of the split control surface in different directions.

Suitable actuators include devices that can provide linear movement, and include pneumatic actuators, hydraulic actuators, rotary electric motors and linear motors. It should be appreciated that split control surfaces (such as those depicted in FIG. 6B) can utilize a pair of actuators, with one actuator associated with each segment and working in concert. Such actuators are preferably lightweight and have a characteristic duty cycle that permits use over a period of years without failure. In a preferred embodiment such flight control actuators show a tight integration of their internal elements, which can include drive motors, a reticulating ball nut, an output lead screw, and thrust bearings. The motors are preferably of a brushless, permanent magnet design that directly drives a rotating ball nut and associated thrust bearings. In a preferred embodiment the actuator is a "run dry" unit that does not include conventional (e.g. hydrocarbon) lubricants, but rather utilizes self lubricating materials (e.g. tungsten disulfide hardened steel) in conjunction with silicon carbide components (for example, in the ball nut and the thrust bearings) to achieve both a reduction in mass and improved reliability. In such an embodiment torque resulting from the conversion or rotary to linear motion can be removed directly to wing structures and/or associated control surfaces through pivot points. Such an actuator can include a sensor that provides data related to wear (for example, providing a signal indicating use, a signal indicating response vs power applied, etc.), and such data can be provided to an onboard controller of the aircraft.

Aircraft of the inventive concept achieve safety and reliability in long duration flight, at least in part, by minimizing the use of active control surfaces. Such an aircraft can spend the majority of flight duration using free flight, for example in steady flight and controlling engine speed to execute gradual course changes. In combination with design features of the aircraft that enhance stability (for example, the use of a rigid airframe that resists deformation, swept lifting surfaces that enhance pitch damping in an all wing configuration, etc.) such free flight control is adequate to sustain constant flight under slow response conditions (e.g. cruising flight at desired altitude and calm weather). Aircraft of the inventive concept can achieve additional flight stability by positioning of the aircraft's center of gravity relative to the effective chord of the wing. For example, the aircraft's weight can be distributed such that its center of gravity has a positive static margin of at least 3% of the mean aerodynamic chord. Under rapid response conditions (e.g. takeoff, landing, inclement weather, rapid course redirections from the onboard controller or an operator), however, aircraft of the inventive concept can be under active flight control (i.e. with control surfaces activated). Aircraft of the inventive concept can be under active flight control (i.e. with at least one actuator associated with a control surface active) for about 5%, about 2.5%, about 1%, or less than 1% of a flight duration of two months or more. Alternatively, an actuator associated with a control surface of an aircraft of the inventive concept can have a duty cycle that is about 5%, about 2.5%, about 1%, or less than 1% of a flight duration of two months or more.

An aircraft of the inventive concept can include a controller (for example, an on-board computer) that can control various aspects of aircraft function. In a preferred embodiment such a controller can include two or more CPUs, which are in communication with sensors that provide aircraft telemetry and sensors that monitor the status and/or performance of various aircraft components (for example, motors, actuators, photovoltaic cells, energy storage devices, wing position, control surface position etc.). Such a controller can, for example, provide adjustment for wing segment position in order to balance collection of solar power collection against aerodynamic efficiency and/or energy storage capacity, based on either sensor input or stored information related to date and time. Similarly, such a controller can utilize information obtained from sensors (for example, air speed sensors, air pressure sensors, temperature sensors, accelerometers, etc.) to control motor speed, propeller blades pitch and/or activate actuators associated with control surfaces. Such a controller can include or be in communication with a database that includes data related to use of onboard systems (for example, motors of motor-propeller assemblies, actuators coupled to control surfaces, battery charge/discharge cycles, etc.), and can utilize such stored data in deriving instructions for a control maneuver and/or power distribution. For example, data indicating that a particular control surface actuator has accumulated excessive use or is showing indications of wear can be used by the controller to derive instructions that avoid or minimize the use of that actuator. Similarly, data indicating wear or reduced performance of a motor of a motor-propeller assembly can be used by the controller to derive instructions to reduce the speed of the worn motor and compensate.

In some embodiments the controller can receive instructions from a remote user and adjust the flight of the aircraft (using free flight control, active control, or both) appropriately. In some embodiments of the inventive concept the controller can utilize stored data to predict component failure, and to notify a remote operator regarding such an impending failure. On receiving such a notification the remote operator can send instructions to the controller directing it to proceed to a recovery area and land for servicing. Such a controller can be programmed to permit flight durations of 1 month, 2 months, 3 months, 4 months, 5 months, 6 months, 1 year, 18 months, 2 years, 3 years, 4 years, 5 years, or more than 5 years, for example through optimization of solar energy collection and/or minimization of the duty cycle of on-board actuators in combination with the use of a rigid airframe that provides resistance to non-ideal weather conditions.

Exemplary characteristics of an aircraft of the inventive concept configured as a flying wing are provided in Table 2:

TABLE 2

| Wing Reference | | | |
|---|---|---|---|
| Total Area | 400 ft² | | |
| Total Span | 96 ft | | |
| Aspect Ratio | 23 | | |

| Center Wing | | | |
|---|---|---|---|
| Planform Area | 59 ft² | | |
| Half Span | 6 ft | | |
| Stack Line | 33% x/c | | |
| Chord | 4.92 ft | | |
| Incidence | 0 deg | | |
| Airfoil | LRMII-14 | | |
| Reynolds Number* | −300,000 | | |
| Taper Ratio | 1.000 | | |

*63,000 ft, 56.3 KTAS, Lower Re at higher altitude

| Nacelle/Boom | | | |
|---|---|---|---|
| Total Length | 10.0 ft | | |
| Maximum Diameter | 7.7 in | | |
| Wetted Area | 25.3 ft2 | | |
| Volume | 5.4 ft3 | | |

| Propeller | | | |
|---|---|---|---|
| Diameter | 8.0 ft | | |
| RPM Range | 225-900 | | |

| Wing Tip | | | |
|---|---|---|---|
| Area (ea.) | 9.0 ft² | | |
| Length | 3.0 ft | | |
| Root Chord | 3.1 ft | | |
| Tip Chord | 2.9 ft | | |
| Sweep | −14.0 deg | | |

| Inboard Wing | | | | |
|---|---|---|---|---|
| Planform | 188.6 | ft² | | |
| Half Span | 21 | ft | | |
| Stack Line | 33% | x/c | | |
| Leading Edge Sweep | 15.0 | deg | | |
| Taper Ratio | 0.825 | | | |
| | Root | Mid | Tip | |
| Chord | 4.92 | 4.49 | 4.06 | ft |
| BL | 72 | 198 | 324 | in |
| Incidence | 0 | −0.25 | −0.75 | deg |
| Airfoil | LRMII-14 | 400INTE7 | 400INTE3 | |
| Reynolds Number* | −300,000 | −275,000 | −250,000 | |
| Thickness to Chord Ratio | 14.0% | 13.75% | 13.5% | |

TABLE 2-continued

Outboard Wing

| | | | | | |
|---|---|---|---|---|---|
| Planform | 152.5 | ft² | | | |
| Half Span | 21 | ft | | | |
| Stack Line | 33% | x/c | | | |
| Leading Edge Sweep | 15.0 | deg | | | |
| Taper Ratio | 0.788 | | | | |
| | Root | Int. 1 | Int. 2 | Tip | |
| Chord | 4.06 | 3.63 | 3.42 | 3.2 | ft |
| BL | 324 | 450 | 513 | 576 | in |
| Incidence | −0.75 | −2.00 | −3.25 | −5.00 | deg |
| Airfoil | 400INTE3 | 400INTE4 | 400INTE5 | 400INTE8 | |
| Reynolds Number* | −250,000 | −225,000 | −213,000 | −200,000 | |
| Thickness to Chord Ratio | 13.5% | 12.0% | 11% | 10.0% | |

Control Surfaces

| | Type | x/c | Deflection | |
|---|---|---|---|---|
| Inboard Surface | Plain | 25% | −20° | +40° |
| Upper Outboard Surface | Split | 25% | −60° | +20° |
| Lower Outboard Surface | Split | 25% | −20° | +60° |

Such an aircraft can have aerodynamic characteristics as shown in FIGS. 9A and 9B. Exemplary characteristics of another aircraft of the inventive concept that is configured as a flying wing are shown in Table 3:

TABLE 3

Wing Reference

| | |
|---|---|
| Total Area | 900 ft² |
| Total Span | 150 ft |
| Aspect Ratio | 25 |

Center Wing

| | |
|---|---|
| Planform Area | 135 ft² |
| Half Span | 9 ft |
| Stack Line | 33% x/c |
| Chord | 7.5 ft |
| Incidence | 0 deg |
| Airfoil | LRMII-16 |
| Reynolds Number* | −450,000 |
| Taper Ratio | 1.000 |

*63,000 ft, 56.3 KTAS, Lower Re at higher altitude

Nacelle/Boom

| | |
|---|---|
| Total Length | 15 ft |
| Maximum Diameter | 18.8 in |
| Wetted Area | 56.9 ft2 |
| Volume | 18.3 ft3 |

Propeller

| | |
|---|---|
| Diameter | 12.0 ft |
| RPM Range | 175-700 |

Wing Tip

| | |
|---|---|
| Area (ea.) | 15.3 ft² |
| Length | 3.83 ft |
| Root Chord | 4.1 ft |
| Tip Chord | 3.90 ft |
| Sweep | −14.0 deg |

Inboard Wing

| | | | | |
|---|---|---|---|---|
| Planform | 438.9 | ft² | | |
| Half Span | 33 | ft | | |
| Stack Line | 33% | x/c | | |
| Leading Edge Sweep | 15.0 | deg | | |
| Taper Ratio | 0.773 | | | |
| | Root | Mid | Tip | |
| Chord | 7.50 | 6.65 | 5.80 | ft |
| BL | 108 | 306 | 504 | in |
| Incidence | 0 | −0.25 | −0.75 | deg |

TABLE 3-continued

| Airfoil | LRMII-16 | INTEB6 | INTEB1 | |
|---|---|---|---|---|
| Reynolds Number* | −450,000 | −400,000 | −350,000 | |
| Thickness to Chord Ratio | 16.0 | 15.5 | 15.0 | |

| Outboard Wing | | | | | |
|---|---|---|---|---|---|
| Planform | 326.7 | ft² | | | |
| Half Span | 33 | ft | | | |
| Stack Line | 33% | x/c | | | |
| Leading Edge Sweep | 15.0 | deg | | | |
| Taper Ratio | 0.707 | | | | |
| | Root | Int. 1 | Int. 2 | Tip | |
| Chord | 5.8 | 4.95 | 4.53 | 4.1 | ft |
| BL | 504 | 702 | 801 | 900 | in |
| Incidence | −0.75 | −2.00 | −3.25 | −5.00 | deg |
| Airfoil | INTEB1 | INTEB4 | INTEB5 | INTEB3 | |
| Reynolds Number* | −350,000 | −300,000 | −275,000 | −250,000 | |
| Thickness to Chord Ratio | 15.0% | 14.0% | 13.5% | 13.0% | |

| Control Surfaces | | | | |
|---|---|---|---|---|
| | Type | x/c | Deflection | |
| Inboard Surface | Plain | 25% | −20° | +40° |
| Upper Outboard Surface | Split | 25% | −60° | +20° |
| Lower Outboard Surface | Split | 25% | −20° | +60° |

As noted above, such high altitude, high latitude, and long endurance aircraft can have considerable utility as a telecommunications relay. As such, an aircraft of the inventive concept can include a telecommunications transmitter/receiver. Such a telecommunications transmitter/receiver can receive an incoming electromagnetic (for example, RF or microwave) data signal and rebroadcast it, thereby effectively extending the range of the originating transmitter. For example, a ground-based transmitter or transmitter/receiver can broadcast an electromagnetic signal that is received by a transmitter/receiver of an aircraft of the inventive concept. The aircraft's transmitter/receiver can rebroadcast the electromagnetic signal, to be received by another transmitter/receiver (for example, a transmitter/receiver at a different ground station or in a different aircraft), to establish a communications network that incorporates an aircraft of the inventive concept. Such a network can include a plurality of such aircraft operating in long endurance (i.e. 2 months or more) flight at high altitude (i.e. greater than or equal to 50,000 feet). In some embodiments of the inventive concept such a communications network can include from 1 to 500 solar powered, long flight duration aircraft. In some embodiments such a communications network can include over 500 solar powered, long flight duration aircraft.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of manufacturing a solar powered aircraft comprising:
    molding a plurality of wing segments using a composite material;
    assembling a wing comprising a plurality of the wing segments, wherein at least two of the plurality of wing segments are joined by a hinge and wherein at least one of the at least two segments comprises a photovoltaic cell coupled to at least one of at least two segments and is configured to supply electrical power to the aircraft, wherein the wing has a stiffness that provides a natural frequency that is greater than or equal to 1.3 Hz times (100 ft/wing span, ft)$^{1.5}$,
    wherein the hinge is configured to reversibly deflect at least one of the at least two segments to a positive or negative dihedral angle while the aircraft is in flight, and
    wherein the aircraft has a center of gravity having a positive static pitch stability margin of at least 3% of mean aerodynamic chord;
    coupling a plurality of motor-propeller assemblies each comprising a variable pitch propeller to a central segment of the aircraft, and wherein greater than 50% of the motor-propeller assemblies are coupled to the central segment of the aircraft;
    incorporating an active control surface that is coupled with an actuator into the aircraft; and
    incorporating a controller that is communicatively coupled with at least one of the plurality of motor-propeller assemblies and with the actuator into the aircraft, wherein the controller is configured to optimize flight reliability of the aircraft through provision of a first command to the at least one of the plurality of motor-propeller assemblies in slow response conditions and wherein the controller is second command to the actuator in rapid response conditions, wherein the controller is configured to provide an actuator duty cycle of less than 5% during a flight duration of at least 2 months.

2. The method of claim 1, wherein the aircraft does not include a tail, and wherein the wing has a stiffness that provides a natural frequency that is greater than or equal to 3.2 Hz times (100 ft/wing span, ft)$^{1.5}$.

3. The method of claim 1, wherein the wing is a swept wing.

4. The method of claim 1, wherein each of the assemblies comprises an electric motor that is directly plurality of motor-propeller coupled to a propeller.

5. The method of claim 1, wherein slow response conditions comprise calm weather conditions.

6. The method of claim 1, wherein rapid response conditions comprise inclement weather conditions.

7. The method of claim 1, wherein the controller is configured to maintain flight endurance of the aircraft at an altitude of at least 50,000 feet for at least 2 winter months at from 400 N latitude to 300 S latitude.

8. The method of claim 1, wherein the controller is configured to maintain flight endurance of the aircraft at an altitude of at least 50,000 feet for up to 5 years at from 400 N latitude to 300 S latitude.

9. The method of claim 1, wherein the controller is configured to provide an actuator duty cycle of less than 2.5% during a flight duration of at least 2 months.

10. The method of claim 1, wherein the controller is configured to provide an actuator duty cycle of less than 1% during a flight duration of at least 2 months.

11. The method of claim 1, wherein the controller utilizes free flight control in slow response conditions, wherein free flight control utilizes only the motor-propeller assemblies.

12. The method of claim 1, further comprising the step of incorporating a telecommunications transmitter/receiver into the aircraft.

13. The method of claim 1, further comprising the step of incorporating an energy storage device selected from the group consisting of a battery, a fuel cell, and a capacitor bank, wherein the energy storage device is electrically coupled to the photovoltaic cell.

14. A method of controlling a solar powered aircraft comprising:

providing a solar powered aircraft comprising a wing, the wing comprising a plurality of the wing segments, wherein at least two of the plurality of wing segments are joined by a hinge and wherein at least one of the at least two segments comprises a photovoltaic cell coupled to at least one of at least two segments and is configured to supply electrical power to the aircraft, wherein the wing has a stiffness that provides a natural frequency that is greater than or equal to 1.3 Hz times (100 ft/wing span, ft)$^{1.5}$, wherein the hinge is configured to reversibly deflect at least one of the at least two segments to a positive or negative dihedral angle while the aircraft is in flight, and wherein the aircraft has a center of gravity having a positive static margin of at least 3% of mean aerodynamic chord;

directing the aircraft in a free flight mode for a first portion of a flight duration of at least 2 months, wherein the first portion comprises at least 95% of the flight duration; and directing the aircraft in an active mode for a second portion of the flight duration, wherein the active mode comprises use of a control surface comprising an actuator, and free flight mode does not include use of active control of the aircraft.

15. The method of claim 14, wherein the free flight mode consists of adjustment of a motor speed.

16. The method of claim 14, wherein the free flight mode is implemented in slow response conditions.

17. The method of claim 14, wherein the active mode is implemented in fast response conditions.

18. The method of claim 17, wherein fast response conditions are selected from the group consisting of takeoff, landing, inclement weather, and remotely-directed course changes.

19. The method of claim 14, wherein the control surface is an elevator or an aileron.

20. The method of claim 14, wherein the first portion is selected to reduce wear of the actuator to provide function of the actuator for the flight duration.

21. The method of claim 20, wherein the flight duration is from 2 months to 5 years.

22. The method of claim 14, wherein both free flight mode and active mode are controlled by a controller located on the aircraft.

* * * * *